(12) United States Patent
Vankamamidi et al.

(10) Patent No.: US 12,105,669 B2
(45) Date of Patent: Oct. 1, 2024

(54) SYSTEMS AND METHODS FOR UTILIZING WRITE-CACHE FOR SIGNIFICANT REDUCTION IN RPO FOR ASYNCHRONOUS REPLICATION

(71) Applicant: EMC IP Holding Company, LLC, Hopkinton, MA (US)

(72) Inventors: Vamsi K. Vankamamidi, Hopkinton, MA (US); Ronen Gazit, Tel Aviv (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 126 days.

(21) Appl. No.: 17/508,363

(22) Filed: Oct. 22, 2021

(65) Prior Publication Data

US 2023/0126253 A1 Apr. 27, 2023

(51) Int. Cl.
*G06F 16/00* (2019.01)
*G06F 12/0802* (2016.01)
*G06F 16/11* (2019.01)

(52) U.S. Cl.
CPC ........ *G06F 16/128* (2019.01); *G06F 12/0802* (2013.01); *G06F 2212/60* (2013.01)

(58) Field of Classification Search
None
See application file for complete search history.

(56) References Cited

U.S. PATENT DOCUMENTS

| 10,545,987 | B2 * | 1/2020 | Borowiec | G06F 11/1458 |
| 10,942,650 | B1 * | 3/2021 | Fay | G06F 3/0608 |
| 11,036,677 | B1 * | 6/2021 | Grunwald | G06F 3/067 |
| 11,150,834 | B1 * | 10/2021 | Fay | G06F 3/0673 |
| 11,474,701 | B1 * | 10/2022 | Fay | G06F 3/061 |
| 11,803,567 | B1 * | 10/2023 | Borowiec | G06F 3/061 |
| 2012/0215970 | A1 * | 8/2012 | Shats | G06F 11/1446 |
| | | | | 711/E12.008 |
| 2013/0042056 | A1 * | 2/2013 | Shats | G06F 12/0871 |
| | | | | 711/E12.008 |
| 2015/0347548 | A1 * | 12/2015 | Mortensen | G06F 16/2365 |
| | | | | 707/618 |
| 2016/0196320 | A1 * | 7/2016 | Borowiec | G06F 3/061 |
| 2016/0350006 | A1 * | 12/2016 | Wang | G06F 3/0608 |
| 2016/0350325 | A1 * | 12/2016 | Wang | G06F 3/0619 |
| 2018/0150397 | A1 * | 5/2018 | Gupta | G06F 12/0813 |
| 2021/0034245 | A1 * | 2/2021 | Tylik | G06F 3/0683 |
| 2021/0279204 | A1 * | 9/2021 | Grunwald | G06F 21/78 |
| 2022/0011961 | A1 * | 1/2022 | Fay | G06F 3/0688 |
| 2022/0050858 | A1 * | 2/2022 | Karr | G06F 11/3466 |
| 2023/0023279 | A1 * | 1/2023 | Fay | G06F 3/0644 |
| 2023/0259299 | A1 * | 8/2023 | Fay | G06F 3/0604 |
| | | | | 711/170 |
| 2023/0385738 | A1 * | 11/2023 | Lobell | G06Q 10/0637 |

* cited by examiner

*Primary Examiner* — Farhan M Syed
(74) *Attorney, Agent, or Firm* — Brian J. Colandreo; Heath M. Sargeant; Holland & Knight LLP

(57) ABSTRACT

A method, computer program product, and computer system for receiving, by a computing device, a snapshot create operation of a volume to create a first snapshot. Existing dirty data of the volume for the first snapshot may be flushed from an in-memory cache. New writes to the volume for the first snapshot may be maintained in the in-memory cache as dirty. A snapshot create operation to the volume may be received to create a second snapshot. The new writes to the volume for the first snapshot may be combined as part of the second snapshot.

14 Claims, 5 Drawing Sheets ns and methods for utilizing write-cache for significant reduction in rpo for asynchronous replication

BACKGROUND

Asynchronous replication between storage appliance volumes is beneficial for ensuring data is protected, for example, should data on one volume ever be lost or otherwise corrupted. The time by which a remote storage appliance's data is out of sync with the production volume is a function of the time it takes to execute asynchronous replication, discussed further below. If the production volume/appliance experiences data-loss, then during recovery using the remote appliance, all the data that was ingested on the production volume during this time generally cannot be recovered. This time is referred to as the recover point objective (RPO), and thus is may be beneficial to keep this time very low to limit any data loss. RPO times typically range from few minutes (e.g., 15 minutes) to even a few seconds (e.g., 3 seconds), depending on a number of factors, including the size of data needing to be replicated. Some storage systems with potentially large amounts of data may currently support RPO times of 5 minutes under moderate load, implying that the asynchronous replication needs to be completed in 2.5 minutes). Another potentially important criterion during asynchronous replication is not to impact performance (e.g., latency spikes) while trying to achieve the RPO goals.

BRIEF SUMMARY OF DISCLOSURE

In one example implementation, a method, performed by one or more computing devices, may include but is not limited to receiving, by a computing device, a snapshot create operation of a volume to create a first snapshot. Existing dirty data of the volume for the first snapshot may be flushed from an in-memory cache. New writes to the volume for the first snapshot may be maintained in the in-memory cache as dirty. A snapshot create operation to the volume may be received to create a second snapshot. The new writes to the volume for the first snapshot may be combined as part of the second snapshot.

One or more of the following example features may be included. The volume may include a flag indicating that the snapshot is a replication related snapshot. New writes to the volume for the second snapshot may be maintained in the in-memory cache as dirty. At least a portion of the new writes in the in-memory cache may be flushed based upon, at least in part, resource constraints of the in-memory cache. A difference between the first snapshot and the second snapshot in the in-memory cache may be determined. A read request may be received for the difference between the first snapshot and the second snapshot in the in-memory cache. A request may be received to delete the first snapshot and flush dirty data of the second snapshot in the in-memory cache to the volume.

In another example implementation, a computing system may include one or more processors and one or more memories configured to perform operations that may include but are not limited to receiving a snapshot create operation of a volume to create a first snapshot. Existing dirty data of the volume for the first snapshot may be flushed from an in-memory cache. New writes to the volume for the first snapshot may be maintained in the in-memory cache as dirty. A snapshot create operation to the volume may be received to create a second snapshot. The new writes to the volume for the first snapshot may be combined as part of the second snapshot.

One or more of the following example features may be included. The volume may include a flag indicating that the snapshot is a replication related snapshot. New writes to the volume for the second snapshot may be maintained in the in-memory cache as dirty. At least a portion of the new writes in the in-memory cache may be flushed based upon, at least in part, resource constraints of the in-memory cache. A difference between the first snapshot and the second snapshot in the in-memory cache may be determined. A read request may be received for the difference between the first snapshot and the second snapshot in the in-memory cache. A request may be received to delete the first snapshot and flush dirty data of the second snapshot in the in-memory cache to the volume.

In another example implementation, a computer program product may reside on a computer readable storage medium having a plurality of instructions stored thereon which, when executed across one or more processors, may cause at least a portion of the one or more processors to perform operations that may include but are not limited to receiving a snapshot create operation of a volume to create a first snapshot. Existing dirty data of the volume for the first snapshot may be flushed from an in-memory cache. New writes to the volume for the first snapshot may be maintained in the in-memory cache as dirty. A snapshot create operation to the volume may be received to create a second snapshot. The new writes to the volume for the first snapshot may be combined as part of the second snapshot.

One or more of the following example features may be included. The volume may include a flag indicating that the snapshot is a replication related snapshot. New writes to the volume for the second snapshot may be maintained in the in-memory cache as dirty. At least a portion of the new writes in the in-memory cache may be flushed based upon, at least in part, resource constraints of the in-memory cache. A difference between the first snapshot and the second snapshot in the in-memory cache may be determined. A read request may be received for the difference between the first snapshot and the second snapshot in the in-memory cache. A request may be received to delete the first snapshot and flush dirty data of the second snapshot in the in-memory cache to the volume.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
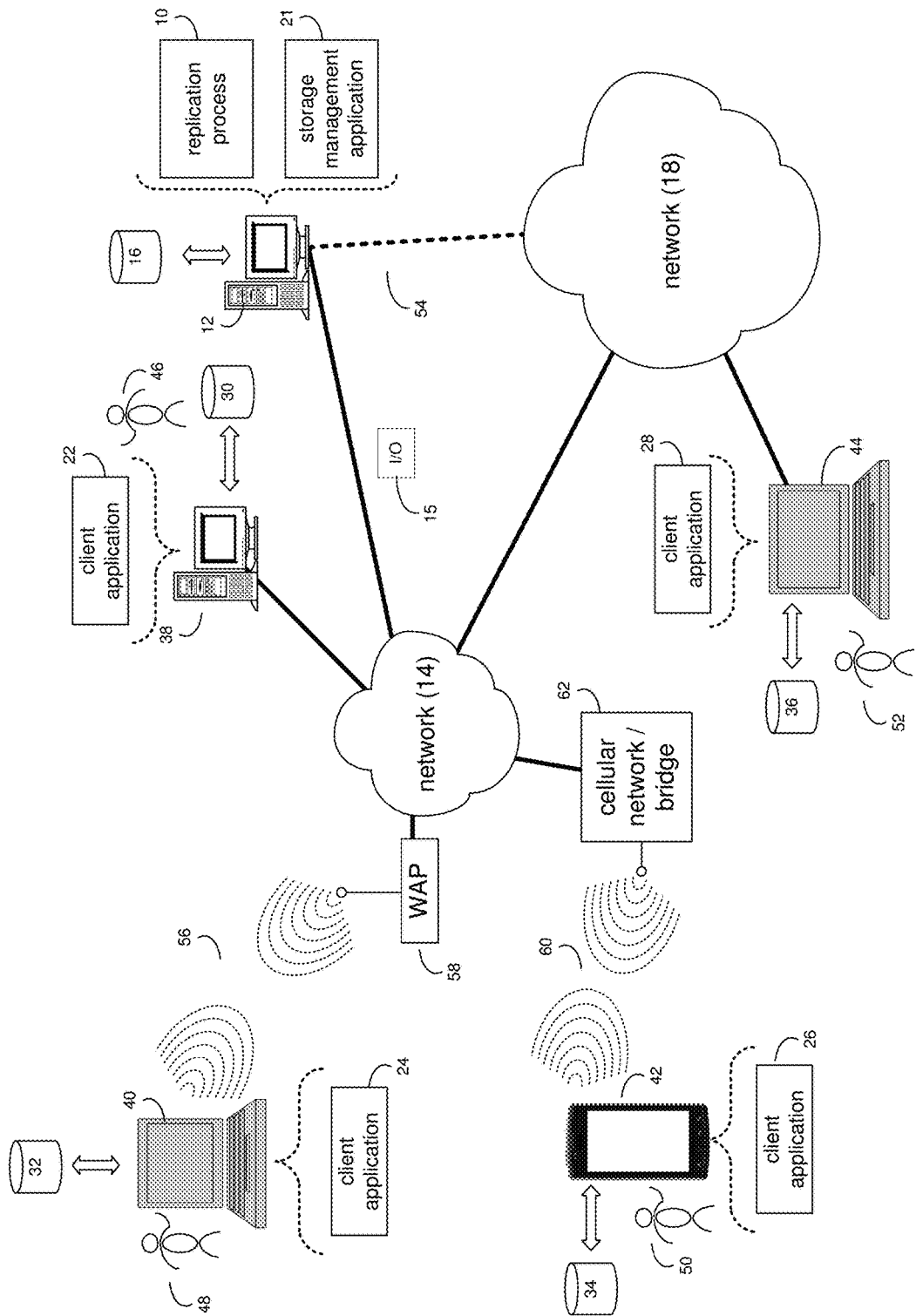
FIG. 1 is an example diagrammatic view of a replication process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown replication process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a Redundant Array of Inexpensive Disks/Redundant Array of Independent Disks (RAID) device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a replication process, such as replication process 10 of FIG. 1, may receive, by a computing device, a snapshot create operation of a volume to create a first snapshot. Existing dirty data of the volume for the first snapshot may be flushed from an in-memory cache. New writes to the volume for the first snapshot may be maintained in the in-memory cache as dirty. A snapshot create operation to the volume may be received to create a second snapshot. The new writes to the volume for the first snapshot may be combined as part of the second snapshot.

In some implementations, the instruction sets and subroutines of replication process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, replication process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, replication process 10 and/or storage management application 21 may be accessed via one or more of client applications 22, 24, 26, 28. In some implementations, replication process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within replication process 10, a component of replication process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of replication process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of replication process 10 (and vice versa). Accordingly, in some implementations, replication process 10 may be a purely server-side application, a purely client-side application, or a hybrid server-side/client-side application that is cooperatively executed by one or more of client applications 22, 24, 26, 28 and/or replication process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, replication process 10, and storage management application 21, taken singly or in any combination, may effectuate some or all of the same functionality, any description of effectuating such functionality via one or more of client applications 22, 24, 26, 28, replication process 10, storage management application 21, or combination thereof, and any described interaction(s) between one or more of client applications 22, 24, 26, 28, replication process 10, storage management application 21, or combination thereof to effectuate such functionality, should be taken as an example only and not to limit the scope of the disclosure.

In some implementations, one or more of users 46, 48, 50, 52 may access computer 12 and replication process 10 (e.g., using one or more of client electronic devices 38, 40, 42, 44) directly through network 14 or through secondary network 18. Further, computer 12 may be connected to network 14 through secondary network 18, as illustrated with phantom link line 54. Replication process 10 may include one or more user interfaces, such as browsers and textual or graphical user interfaces, through which users 46, 48, 50, 52 may access replication process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
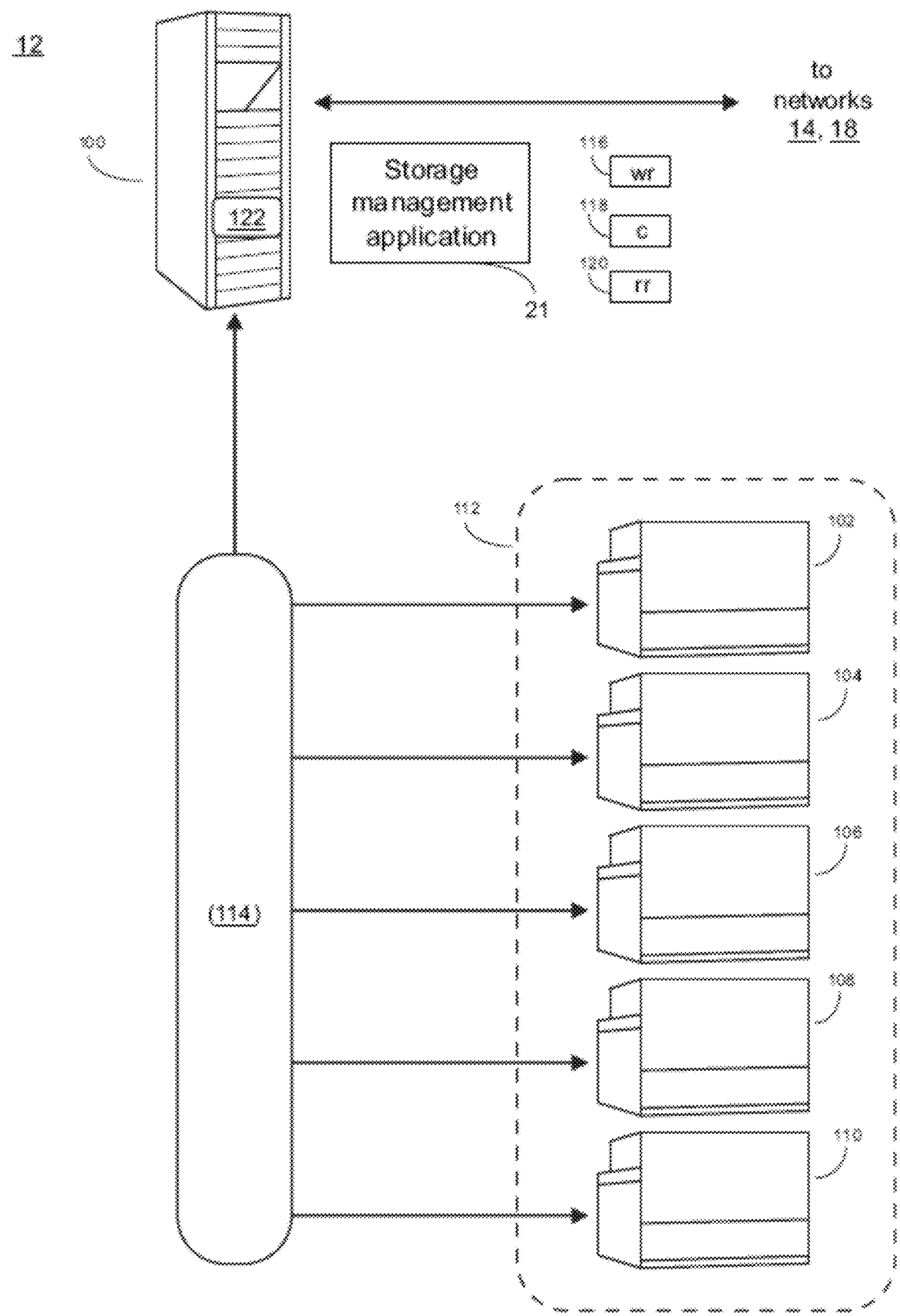
FIG. 2 is an example diagrammatic view of a storage system of FIG. 1 according to one or more example implementations of the disclosure.
Figure 3:
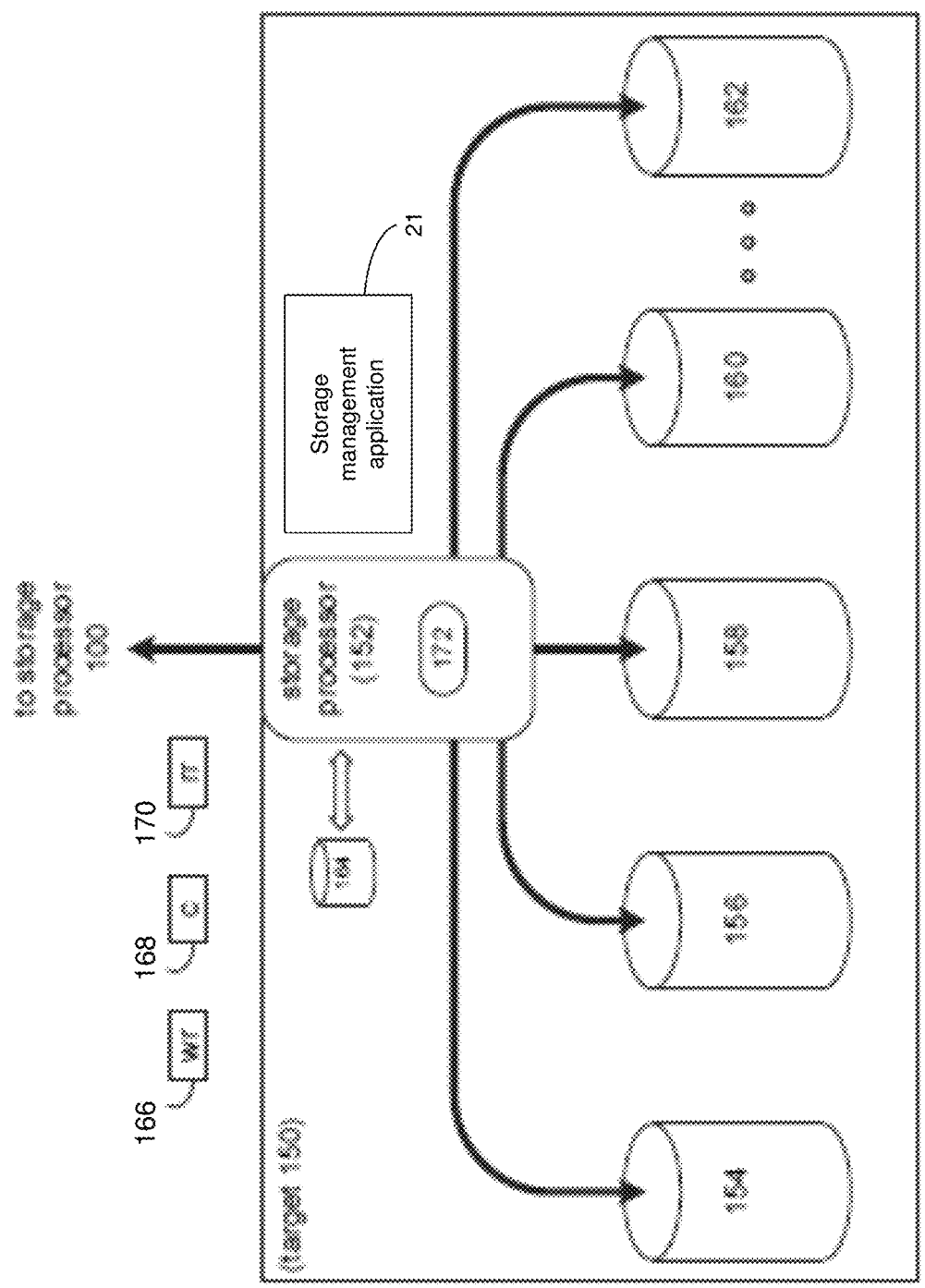
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or replication process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

The Asynchronous Replication Process:

Asynchronous replication between storage appliance volumes is beneficial for ensuring data is protected, for example, should data on one volume ever be lost or otherwise corrupted. Referring to the example of FIG. 4, an example asynchronous replication process flow 400 (in steady state) is shown. As can be seen, the process flow is as follows:

1. Taking a snapshot on the production volume.
2. Issuing a copy-diff (difference) operation between the latest snapshot and the previous snapshot.
3. Cache flushing all the dirty data which is part of the latest snapshot into Mapper;
   a. This may involve creating a mapping tree;
   b. Data reduction may be performed (e.g., dedupe, compression, etc.); and
   c. Late-binding to physical capacity.
4. Mapper executing a copy-diff on the mapping tree;
   a. This may involve locking and traversing the mapping tree for the two snapshots and comparing the mapping pointers and recording the diffs.
5. Reading the data belonging to the latest snapshot;
   a. Locking and traversing the mapping tree; and
   b. Decompressing and returning the data.
6. Shipping the data to the remote site.
7. Deleting the previous snapshot which may involve;
   a. Putting the mapping tree for the snapshot in the trash-bin;
   b. Running a background trash-bin process to traverse the mapping tree and dec-ref the data belonging to the snapshot; and
   c. Run background dec-ref process to reclaim the physical capacity.
8. Repeat Steps 1-7.

The time by which a remote storage appliance's data is out of sync with the production volume is a function of the time it takes to execute asynchronous replication (e.g., execute steps 1-7 above). If the production volume/appliance experiences data-loss, then during recovery using the remote appliance, all the data that was ingested on the production volume during this time generally cannot be recovered. This time is referred to as the recover point objective (RPO), and thus is may be beneficial to keep this time very low to limit any data loss. RPO times typically range from few minutes (e.g., 15 minutes) to even a few seconds (e.g., 3 seconds), depending on a number of factors, including the size of data needing to be replicated. Some storage systems with potentially large amounts of data may currently support RPO times of 5 minutes under moderate load, implying that the asynchronous replication needs to be completed in 2.5 minutes). Another potentially important criterion during asynchronous replication is not to impact performance (e.g., latency spikes) while trying to achieve the RPO goals. Therefore, as will be discussed in greater detail below, the present disclosure provides a mechanism to significantly bring down the RPO time and minimize any performance impact by, e.g., removing the Mapper overhead associated with the snapshot creation, deletion and copy-diff operations.

Figure 4:
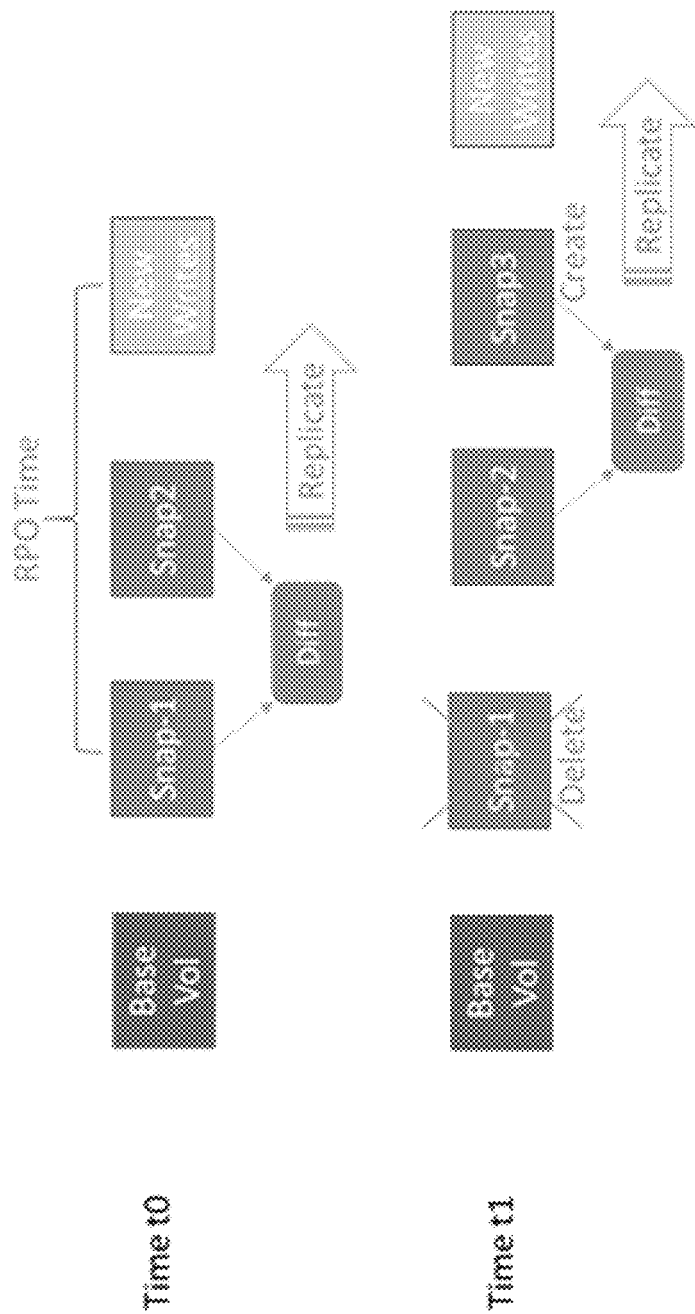
FIG. 4 is an example flowchart of a replication process according to one or more example implementations of the disclosure.
Figure 5:
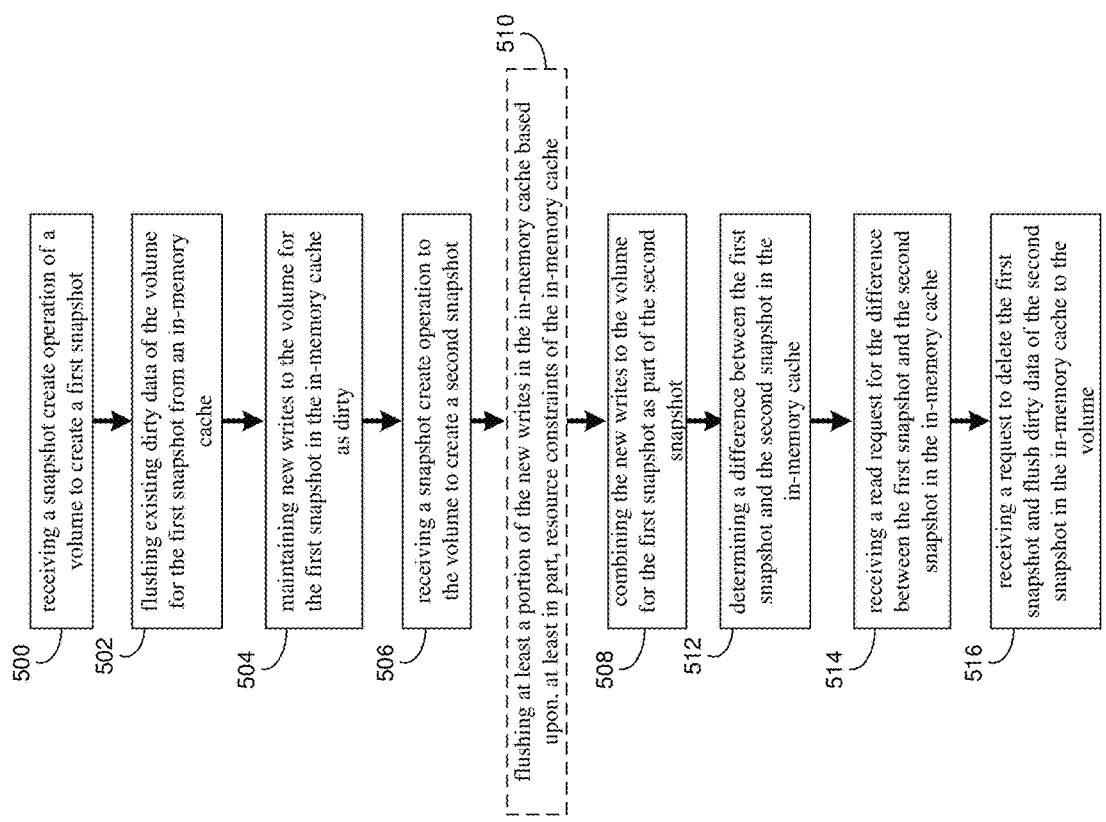
FIG. 5 is an example flowchart of a replication process according to one or more example implementations of the disclosure.

As discussed above and referring also at least to the example implementations of FIGS. 4-5, replication process 10 may receive 500, by a computing device, a snapshot create operation of a volume to create a first snapshot. Replication process 10 may flush 502 existing dirty data of the volume for the first snapshot from an in-memory cache. Replication process 10 may maintain 504 new writes to the volume for the first snapshot in the in-memory cache as dirty. Replication process 10 may receive 506 a snapshot create operation to the volume to create a second snapshot. Replication process 10 may combine 508 the new writes to the volume for the first snapshot as part of the second snapshot.

As will be discussed in further detail below, replication process 10 may leverage the fact that snapshots for asynchronous replication are created and deleted at high frequency. That is, in case of a 5 minute RPO, a snapshot is created and then deleted within 5 minutes. And, if the RPO time is improved, then snapshots are created and deleted at an even higher frequency (e.g., in case of a 1 minute RPO, snapshots are created and deleted every 1 min). In such an example scenario, it is feasible to leave all the dirty data associated with the two replication snapshots in "write cache" (e.g., an in-memory write cache), execute the difference (Diff) operation within the in-memory write cache and then process the snapshot delete within the in-memory write cache and flush out the dirty data to the base volume. In some implementations, some of the dirty data may be flushed out due to resource constraints (i.e., dirty in-memory write cache filling up), and as similarly described in FIG. 4, the Diff may be executed in the in-memory write cache and then sent to Mapper where Diff likely will execute on a much sparser tree and find fewer Diffs resulting in less performance overhead in Mapper and backend.

In some implementations, replication process 10 may receive 500, by a computing device, a snapshot create operation of a volume to create a first snapshot, and in some implementations, the volume may include a flag indicating that the snapshot is a replication related snapshot. For example, the client (e.g., replication service) may issue a snapshot create operation to create a volume with a flag indicating that it is a replication related snapshot (referred to as S1). Such a snapshot create operation may be received 500 by replication process 10.

In some implementations, replication process 10 may flush 502 existing dirty data of the volume for the first snapshot from an in-memory cache. For instance, any existing dirty data of the volume (part of S1) may be flushed 502 from the in-memory cache (e.g., also referred to herein as a transaction (Tx)Cache).

In some implementations, replication process 10 may maintain 504 new writes to the volume for the first snapshot in the in-memory cache as dirty. For example, any new writes to the volume (e.g., such as I/O 15 in FIG. 1) may be maintained 504 as dirty in the in-memory TxCache. In some implementations, overwrites of the dirty data may be discarded by replication process 10.

In some implementations, replication process 10 may receive 506 a snapshot create operation to the volume to create a second snapshot and in some implementations, replication process 10 may combine 508 the new writes to the volume for the first snapshot as part of the second snapshot. For example, the client (e.g., replication service) may issue another replication snapshot create operation to create a second snapshot (referred to as S2). Such a snapshot create operation may be received 506 by replication process 10. In some implementations, all the dirty data (new writes maintained 504 to the volume for the first snapshot in the in-memory cache as discussed above) may be combined 508 to become part of S2.

In some implementations, new writes to the volume for the second snapshot may be maintained in the in-memory cache as dirty. For instance, any new writes to the volume for the second snapshot may also be maintained as dirty in the in-memory TxCache.

In some implementations, replication process 10 may flush 510 at least a portion of the new writes in the in-memory cache based upon, at least in part, resource constraints of the in-memory cache. For instance, in case of resource constraints, some of the dirty data in the in-memory TxCache may be flushed 510 to Mapper. For example, some of the dirty data may be flushed out due to resource constraints (i.e., dirty in-memory TxCache filling up), and as similarly described in FIG. 4, the Diff may be executed in the in-memory TxCache and then sent to Mapper where Diff may execute on a much sparser tree and find fewer Diffs resulting in less performance overhead in Mapper and backend.

In some implementations, replication process 10 may determine 512 a difference between the first snapshot and the second snapshot in the in-memory cache. For instance, the client (e.g., replication service) may issue a Copy-Diff of S1 and S2, which may be received by replication process 10. In the example, the in-memory TxCache (e.g., via replication process 10) may examine its in-memory data structures (e.g., dirty-LRU list) to determine 512 and return all the dirty pages that are part of S2. In some implementations, if any dirty data was flushed to Mapper (as noted above due to resource constraints), the copy-diff may then be forwarded to Mapper, which may diff the above-noted mapping tree for S1 and S2 for that portion of the data flushed to Mapper similarly as discussed with regard to FIG. 4.

In some implementations, replication process 10 may receive 514 a read request for the difference between the first snapshot and the second snapshot in the in-memory cache. For instance, the client (e.g., replication service) may issue a read request for the diff blocks between S1 and S2, which may be received 514 by replication process 10. In some implementations, reading of the blocks may be hit in the in-memory TxCache and may be serviced without going to Mapper, and in case dirty data is flushed to Mapper (as noted above due to resource constraints), those blocks may be loaded from the backend.

In some implementations, replication process 10 may receive 516 a request to delete the first snapshot and flush dirty data of the second snapshot in the in-memory cache to the volume. For instance, the client (e.g., replication service) may issue a delete snapshot operation of snapshot S1, which may be received 516 by replication process 10. In the example, namespace and the in-memory TxCache may process deletion of snapshot S1, and in case any dirty data is flushed to Mapper (as noted above due to resource constraints), the delete operation may then be forwarded to Mapper. In some implementations, the in-memory TxCache may (e.g., via replication process 10) proceed with flushing of all the dirty data that is part of S2 to the base-volume. The above-noted steps may be repeated as needed.

There may be sizing considerations for the write cache. For instance, consider a system performing 300 k I/O per second (IOPS) of 8 k size with 2:1 read-write ratio. In this example and non-limiting scenario, write data is being generated at the rate of 800 MB/s. To provide a 1-minute RPO for the entire system (i.e., 100 k write IOPS), the system may need 48 GB of write cache. with a lower RPO (which is the goal), there is a lower pressure on the write-cache, which is a win-win. In case of a higher write IOPS or lower write cache-size, a subset of volumes may be supported with the present disclosure, where a best-effort is made to maintain all the dirty data in cache. This may allow those volumes to support a lower RPO. For rest of the volumes, no specific effort needs to be made to maintain their dirty data in cache. As a result, those volume may only be able to support higher RPO times.

Advantageously, some implementation of the present disclosure may take advantage of several features, such as allowing a transaction (TX)Cache to maintain all the snapshot dependencies for all the dirty data in cache, allow for a much larger write-cache, which may be needed to maintain all the dirty data for replication snapshots in the TxCache, and remove the requirement to flush dirty data in a first in first out (FIFO) order for tail-movement purposes. Consequently, any dirty data may be held for a long duration independent of other dirty data in the cache.

Additionally, through the present disclosure major processing overhead has been removed in the data path associated with creation of the snapshot tree, flushing of the dirty data associated with the snapshot, processing overhead associated with data-reduction, snapshot delete processing (e.g., trash-bin processing, merge-bin processing, dec-ref processing, etc.), which may help to both reduce RPO times and lower the performance impact (e.g., latency spikes) due to the replication service.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, executed on a computing device, comprising:
   receiving, by the computing device, a snapshot create operation of a volume to create a first snapshot;
   flushing existing dirty data of the volume for the first snapshot from an in-memory cache which includes creating a mapping tree, performing data reduction, and late-binding to physical capacity;
   maintaining new writes to the volume for the first snapshot in the in-memory cache as dirty data;
   receiving a snapshot create operation to the volume to create a second snapshot;
   combining the new writes to the volume for the first snapshot as part of the second snapshot;
   removing processing overhead associated with the data reduction, the snapshot creation operation, a snapshot deletion operation, and a difference operation of the volume in order to reduce a recover point objective (RPO) time, wherein the difference operation includes determining a difference between the first snapshot and the second snapshot in the in-memory cache by examining in-memory data structures of the in-memory cache to determine and return all dirty data that are part of the second snapshot and locking and traversing the mapping tree for the first snapshot and the second snapshot, comparing mapping pointers, and recording the difference between the first snapshot and the second snapshot in the in-memory cache; and
   flushing at least a portion of the new writes in the in-memory cache based upon, at least in part, resource constraints of the in-memory cache, wherein the difference operation is then forwarded and executed to the in-memory cache to record the difference of the mapping tree for the first snapshot and the second snapshot for the at least the portion of the new writes flushed to the in-memory cache.

2. The computer-implemented method of claim 1 wherein the volume includes a flag indicating that the snapshot is a replication related snapshot.

3. The computer-implemented method of claim 1 wherein new writes to the volume for the second snapshot are maintained in the in-memory cache as the dirty data.

4. The computer-implemented method of claim 1 further comprising receiving a read request for the difference between the first snapshot and the second snapshot in the in-memory cache.

5. The computer-implemented method of claim 4 further comprising receiving a request for the snapshot deletion operation of the volume to delete the first snapshot and flush dirty data of the second snapshot in the in-memory cache to the volume.

6. A computer program product residing on a non-transitory computer readable storage medium having a plurality of instructions stored thereon which, when executed across one or more processors, causes at least a portion of the one or more processors to perform operations comprising:
receiving a snapshot create operation of a volume to create a first snapshot;
flushing existing dirty data of the volume for the first snapshot from an in-memory cache which includes creating a mapping tree, performing data reduction, and late-binding to physical capacity;
maintaining new writes to the volume for the first snapshot in the in-memory cache as dirty data;
receiving a snapshot create operation to the volume to create a second snapshot;
combining the new writes to the volume for the first snapshot as part of the second snapshot;
removing processing overhead associated with the data reduction, the snapshot creation operation, a snapshot deletion operation, and a difference operation of the volume in order to reduce a recover point objective (RPO) time, wherein the difference operation includes determining a difference between the first snapshot and the second snapshot in the in-memory cache by examining in-memory data structures of the in-memory cache to determine and return all dirty data that are part of the second snapshot and locking and traversing the mapping tree for the first snapshot and the second snapshot, comparing mapping pointers, and recording the difference between the first snapshot and the second snapshot in the in-memory cache; and
flushing at least a portion of the new writes in the in-memory cache based upon, at least in part, resource constraints of the in-memory cache, wherein the difference operation is then forwarded and executed to the in-memory cache to record the difference of the mapping tree for the first snapshot and the second snapshot for the at least the portion of the new writes flushed to the in-memory cache.

7. The computer program product of claim 6 wherein the volume includes a flag indicating that the snapshot is a replication related snapshot.

8. The computer program product of claim 6 wherein new writes to the volume for the second snapshot are maintained in the in-memory cache as the dirty data.

9. The computer program product of claim 6 wherein the operations further comprise receiving a read request for the difference between the first snapshot and the second snapshot in the in-memory cache.

10. The computer program product of claim 9 wherein the operations further comprise receiving a request for the snapshot deletion operation of the volume to delete the first snapshot and flush dirty data of the second snapshot in the in-memory cache to the volume.

11. A computing system including one or more processors and one or more memories configured to perform operations comprising:
receiving a snapshot create operation of a volume to create a first snapshot;
flushing existing dirty data of the volume for the first snapshot from an in-memory cache which includes creating a mapping tree, performing data reduction, and late-binding to physical capacity;
maintaining new writes to the volume for the first snapshot in the in-memory cache as dirty data;
receiving a snapshot create operation to the volume to create a second snapshot;
combining the new writes to the volume for the first snapshot as part of the second snapshot;
removing processing overhead associated with the data reduction, the snapshot creation operation, a snapshot deletion operation, and a difference operation of the volume in order to reduce a recover point objective (RPO) time, wherein the difference operation includes determining a difference between the first snapshot and the second snapshot in the in-memory cache by examining in-memory data structures of the in-memory cache to determine and return all dirty data that are part of the second snapshot and locking and traversing the mapping tree for the first snapshot and the second snapshot, comparing mapping pointers, and recording the difference between the first snapshot and the second snapshot in the in-memory cache; and
flushing at least a portion of the new writes in the in-memory cache based upon, at least in part, resource constraints of the in-memory cache, wherein the difference operation is then forwarded and executed to the in-memory cache to record the difference of the mapping tree for the first snapshot and the second snapshot for the at least the portion of the new writes flushed to the in-memory cache.

12. The computing system of claim 11 wherein the volume includes a flag indicating that the snapshot is a replication related snapshot.

13. The computing system of claim 11 wherein new writes to the volume for the second snapshot are maintained in the in-memory cache as the dirty data.

14. The computing system of claim 11 wherein the operations further comprise:
receiving a read request for the difference between the first snapshot and the second snapshot in the in-memory cache; and
receiving a request for the snapshot deletion operation of the volume to delete the first snapshot and flush dirty data of the second snapshot in the in-memory cache to the volume.

\* \* \* \* \*